Patented Jan. 28, 1941

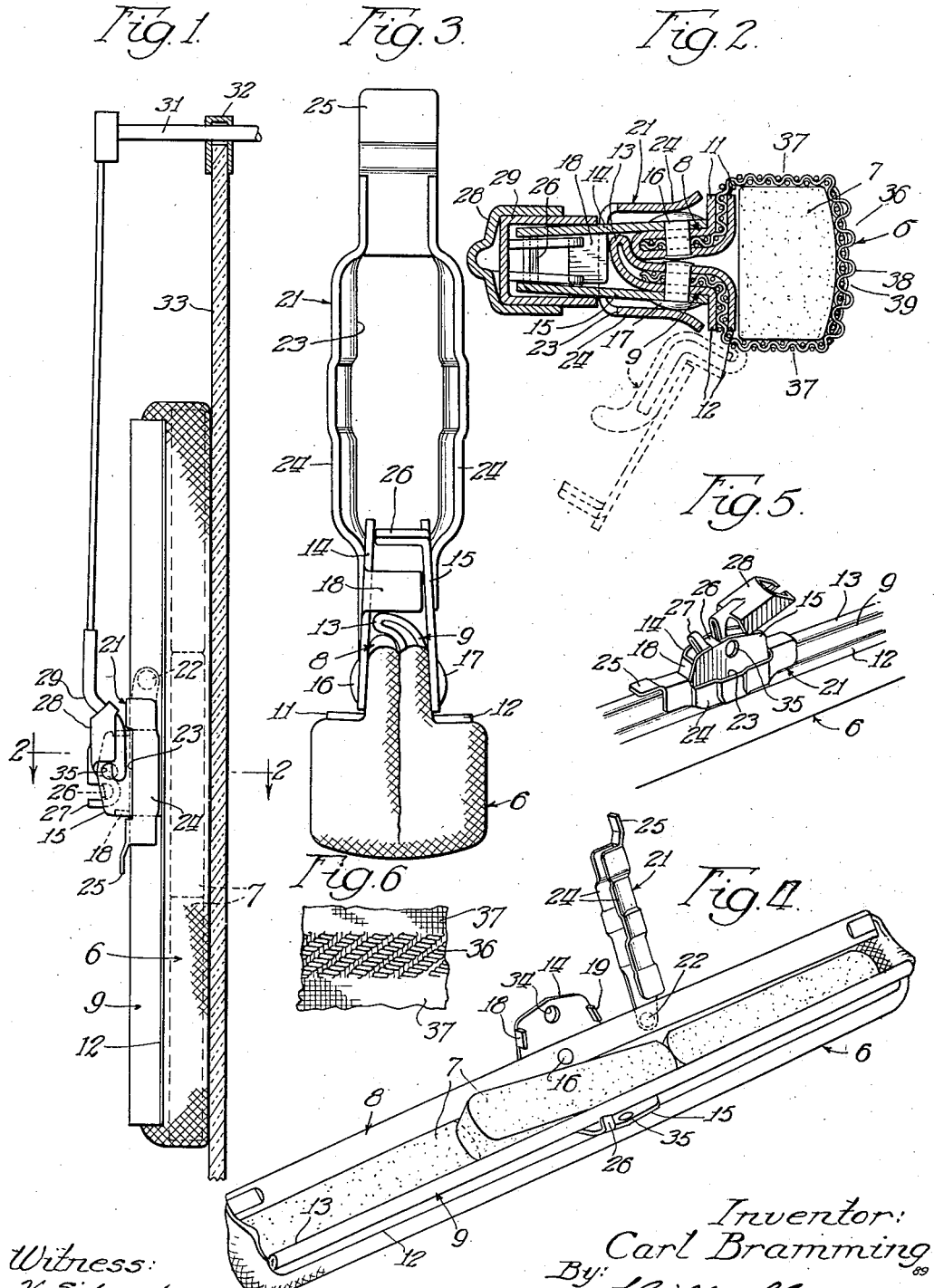

2,229,719

UNITED STATES PATENT OFFICE 2,229,719

WINDSHIELD WIPER

Carl Bramming, Gary, Ind., assignor, by mesne assignments, to Productive Inventions, Inc., Gary, Ind., a corporation of Indiana Application September 18, 1936, Serial No. 101,449

15 Claims. (Cl. 15—250.3)

This invention relates to wipers, and particularly to windshield wipers intended for melting and removing snow, ice, frost, sleet, etc., from the windshield of motor vehicles or the like.

One object of the present invention is to provide a device carrying a water-solvent, ice-melting material comprising, preferably, a suitable chemical compound for melting and removing snow, sleet, frost and the like from the windshield of motor vehicles.

Another object of the invention is to provide a container of novel construction for the water-solvent ice-melting material which will insure efficient cleaning of the windshield, promote the discharge of the material from the container at the windshield engaging side thereof, and assist in the substantially uniform distribution of said ice-melting material to insure efficient operation of the device.

Another object of the invention is to provide a device of the character described, which may be refilled or recharged repeatedly and conveniently whenever a charge of the water-solvent ice-melting material placed therein has become exhausted.

Another object of the invention is to provide a device of the character described, which is capable of immediate use when applied for the purpose intended, without the necessity of treatment of any kind by the user to prepare the device for use.

Another object of the invention is to provide a novel receptacle construction, which may be readily opened for the purpose of refilling, and which may be conveniently secured in closed position and quickly attached to windshield wiper arms of various types of construction by which the device is intended to be operated.

Another object of the invention is to provide a water-solvent ice-melting compound in novel form contributing materially to the lasting or durable qualities of the compound.

Another object of the invention is to provide a novel construction and arrangement whereby adjacent portions, for example, of a motor vehicle will be amply protected against marring or damage by use of a device embodying features of the present invention.

A further object of the invention is to provide a device, which will function efficiently regardless of substantial variations in temperature inside or outside of the windshield on which the device is used.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is an elevational view of my improved wiper and sleet remover illustrating its application to the windshield of a motor vehicle or the like;

Fig. 2 is an enlarged transverse sectional plan view of the wiper and support therefor shown in Fig. 1, and taken substantially as indicated by the line 2—2 thereof;

Fig. 3 is an end elevational view of my improved wiper showing the latch or clamping member therefor in raised position;

Fig. 4 is a perspective view of my improved device showing the receptacle portion thereof in open position to receive renewals or replacements of the contents of the receptacle;

Fig. 5 is a fragmentary perspective view of a portion of the device adjacent the means for securing the receptacle in closed position and for attaching the device to a windshield wiper arm; and Fig. 6 is a fragmentary elevational face view of a portion of the windshield engaging side of the receptacle.

As shown in the drawing, the illustrative embodiment of the present invention comprises an elongated wiping element indicated, as a whole, by the numeral 6, and shown, in the present instance, as formed, preferably, of suitable water-pervious fabric to provide a receptacle intended to contain a water-soluble ice-melting compound or material, such, for example, as salt or the like, shown, in the present instance, as molded into the form of elongated bars 7 of suitable length to facilitate positioning of the ice-melting material in the receptacle, and to retard the otherwise rapid erosion or dissolving of the material when the device is in operation, three of such bars being shown in Fig. 4 as intended to be positioned within the receptacle 6 in substantially longitudinal alignment with respect to each other.

The receptacle 6, as illustrated, is provided with an elongated opening at one side thereof, and the free longitudinal edge portions of the material comprising the receptacle adjacent the opening are shown as engaged by and secured to a pair of elongated substantially parallel frame members, indicated as a whole, and respectively, by the numerals 8 and 9, each of the frame members being shown, in the present instance, as formed of sheet metal folded longitudinally upon itself to receive the fabric of the receptacle between the end portions 11 and 12 of the respective frame members, and bent to a form of substantially L-shaped cross-section having portions thereof positioned back-to-back as illustrated in Fig. 2, to close the open side of the receptacle 6, the frame member 9 being provided with a laterally extending flanged edge portion 13 adapted to overlie and engage an adjacent edge portion of the frame member 8, as clearly illustrated in Fig. 2, thereby providing means for retaining the frame members in substantially parallel relation with respect to each other when in position to close the receptacle.

It will be noted by reference to Figs. 1, 2 and 3 that the exposed or outside edge portions 11 and 12 of the respective frame members 8 and 9, and also the end portions of the frame members outside the receptacle are spaced back or inwardly from the outer side and end portions of the receptacle, thereby providing protection for adjacent portions, for example, of the motor vehicle, when the device is in use, in that the relatively soft yieldable fabric material of the receptacle 6 will engage such portions of the vehicle before the metal of the frame members 8 and 9 could come in contact therewith.

Mounted, preferably, on the outer sides of the respective frame members 8 and 9 are a pair of plates 14 and 15 secured to the frame members 8 and 9 by rivets 16 and 17, respectively, the plate 14 having a pair of longitudinally spaced projections 18 and 19 mounted thereon adapted to engage the flanged edge portions 13 of the frame member 9 at the opposite side thereof from the adjacent engaging edge portion of the frame member 8 in a manner to further assist in retaining the frame members in substantially parallel relation, the projections 18 and 19 serving also to space the plates laterally with respect to each other for the reception of supporting means therebetween.

For securing the frame members 8 and 9 in substantially parallel, receptacle-closing position, a latch or clamping member indicated, as a whole, by the numeral 21 is pivotally mounted at 22, preferably, on the frame member 8, and is provided with an elongated substantially rectangularly shaped aperture 23 having side or leg portions 24—24 at opposite sides thereof adapted to receive the plates 14 and 15 within the aperture 23, and the frame members 8 and 9 between the side or leg portions 24—24 of the latch 21, the latch being provided also with a finger piece 25 adjacent its free end for conveniently swinging the latch 21 about its pivot 22 for releasing the frame members 8 and 9, and the plates 14 and 15 to permit separation of the frame members as shown in Fig. 4 and by dotted lines in Fig. 2 in a manner to provide access to the interior of the receptacle for replacing or renewing the ice-melting material contained therein.

For suitably supporting the device, as a whole, the plate 15 is shown, in the present instance, as provided with a cross bar 26 adapted to be engaged by a hook portion 27 formed on a saddle-like supporting member 28, the supporting member, in the present instance, being suitably mounted on a wiper arm 29 carried by a rock shaft 31 mounted to oscillate in a frame 32 of a windshield 33 in a manner to move the wiper and receptacle 6 thereof across the surface of the windshield when the shaft 31 is rotated.

The arrangement of the projection 18 with reference to the cross bar 26, it will be noted, lends materially to the adaptation of the present device to various types of wiper arms having a hook-like connection thereon, in that the relative position of the cross bar 26 and the projection 18 cooperating with a hook-like portion, for example, of a wiper arm serves to retain the device against relative movement longitudinally with respect to the wiper arm.

Furthermore, the plates 14 and 15 are provided with aligned apertures 34 and 35, respectively, for adapting the device to various other types of wiper arm connections.

To facilitate and accelerate the action of the ice-melting material contained in the device, the fabric of the receptacle 6 is impregnated with the material employed, by subjecting the receptacle to a bath in a solution of the water-solvent ice-melting material, either before or after the receptacle is formed, and before or after the bars 7 are placed in the receptacle.

By reference, particularly, to Figs. 2 and 6 of the drawing, it will be noted that the receptacle 6 is shown as of fabric material having a portion 36 thereof formed preferably of loosely woven strands, and the oppositely disposed side portions 37 relatively closer woven and less pervious, thereby providing a structure adapted to promote the discharge of the ice-melting solution or compound, resulting from the dissolving of the material of the bar 7, through the face portion of the fabric receptacle on the side thereof adjacent the windshield.

It will be noted also that the portion 36 is provided with a plurality of alternating ribs and grooves 38 and 39, respectively, as clearly shown in Fig. 2, the said ribs and grooves being arranged in substantially parallel relation in a manner to provide corrugations on the surface of the portion 36 and adapted to extend preferably across the outer face thereof at an angle to the longitudinal center line of the receptacle, the corrugated and angular arrangement of the ribs 38 acting to facilitate the removal of sleet or ice from the surface of the windshield, and the grooves 39 acting to assist in the substantially uniform distribution of the ice-melting material over the surface of the windshield in a manner to insure efficient operation of the device.

It will be observed from the foregoing description that the present invention provides a novel and efficient construction and arrangement whereby the ice-melting material employed may be replaced or renewed as found necessary, and wherein the action of the material is accelerated without the user first subjecting the device to treatment of any kind to prepare the device for use, or for starting the ice-melting action of the material employed. Also, that by reason of the construction and arrangement shown and described, the device may be readily adapted to wiper arms of various types, that adjacent portions, for example, of a motor vehicle windshield or the like are amply protected against marring or damage by the use of the device embodying features of the present invention, and that novel construction of the fabric of which the receptacle is formed insures efficient cleaning of the windshield, promotes the discharge of the ice-melting material from the container at the windshield engaging side thereof, and assists in the substantially uniform distribution of said material.

Obviously, the present invention is not limited to the precise construction and arrangement shown and described, as the same may be variously modified. Moreover, all the features of the invention need not be used conjointly, as the same may be used to advantage in variously different combinations and sub-combinations.

What I claim as new and desire to secure by Letters Patent is:

1. In a device of the class described and in combination, a pair of rigid frame members, a water-pervious elongated bag-like receptacle connected thereto and having a glass engaging portion at one side of the receptacle, said receptacle having a filler opening therein adjacent said frame members and at the opposite side of the receptacle from said glass engaging portion thereof, ice-melting material in said receptacle, and manually operated means on one of said frame members and cooperable with the other frame member for securing the members together and in receptacle closing position.

2. In a device of the class described and in combination, a wiping element comprising a receptacle of water-pervious material and having an opening therein and free edge portions adjacent said opening, separable frame members secured, respectively, and directly to the free edges of said receptacle, cooperable means on the respective frame members for engaging and securing the members and edge portions of the receptacle together in relatively fixed position with respect to each other, and an ice-melting material in said receptacle.

3. In a device of the class described and in combination, a wiping element comprising a receptacle of water-pervious material and having an open side portion, separable substantially similar frame members permanently secured, respectively, to the free edges of said material and cooperable with each other to close the open side of said receptacle, cooperable means on the respective frame members for securing the members in relatively fixed position with respect to each other, and a water-soluble ice-melting material in said receptacle.

4. In a device of the class described and in combination, a wiping element comprising a receptacle of water-pervious material and having an open side portion, separable substantially parallel adjacent frame members secured, respectively, and directly to the free edges of said material and cooperable with each other to close the open side of said receptacle, cooperable means on the respective frame members for retaining the members in substantially parallel relation and for securing the members in relative fixed receptacle closing position with respect to each other, and a water-soluble ice-melting material in said receptacle.

5. In a device of the class described and in combination, a wiping element comprising a receptacle of water-pervious material having a wiping face on one side thereof and an open side portion on the side opposite said face, separable substantially parallel frame members secured, respectively, and directly to the free edges of said material and cooperable with each other to close the open side of said receptacle, one of said frame members having a laterally extending portion adapted to overlie a portion of the other member, means on said other member cooperable with said laterally extending portion for retaining said members in substantially parallel relation, and means on the respective frame members for securing the members in relatively fixed position with respect to each other and in receptacle closing position.

6. In a device of the class described and in combination, a wiping element comprising a receptacle of water-pervious material having an open side portion, separable substantially parallel adjacent metallic frame members spaced back inwardly from the opposite outer side and end portions of said receptacle and secured, respectively, to the free edges of said material adjacent said open side portion, said members being cooperable with each other to close the open side of said receptacle, one of said frame members having a laterally extending portion adapted to overlie a portion of the other member, means on said other member cooperable with said laterally extending portion for retaining said members in substantially parallel relation, and means on the respective frame members for securing the members in relatively fixed position with respect to each other and in receptacle closing position.

7. In a device of the class described and in combination, a wiping element comprising a fabric receptacle having an opening at one side thereof, a pair of separable substantially parallel frame members secured, respectively, to the free edges of said fabric adjacent said opening and cooperable with each other to close the open side of said receptacle, one of said frame members having a laterally extending edge portion adapted to overlie and engage an edge portion of the other member, a clip comprising a pair of plates mounted, respectively, on said frame members, one of said plates having spaced projections thereon cooperable with said laterally extending edge portion for retaining said members in substantially parallel relation, and means on the respective frame members for securing the members in relatively fixed position with respect to each other and in receptacle closing position.

8. In a device of the class described and in combination, an elongated wiping element comprising a fabric receptacle having an elongated opening at one side thereof, a pair of separable elongated substantially parallel frame members secured, respectively, to the free edges of said fabric adjacent said opening and cooperable with each other to close the open side of said receptacle, one of said frame members having a laterally extending flanged edge portion adapted to overlie and engage an edge portion of the other member, a clip comprising a pair of laterally spaced plates mounted, respectively, on said frame members, the plate on said other member having longitudinally spaced projections thereon extending toward the plate on said flanged member and cooperable therewith for maintaining said plates in spaced relation to each other, said projections being cooperable with said laterally extending flanged edge portion for retaining said members in substantially parallel relation, and means on the respective frame members for securing the members in relatively fixed position with respect to each other and in receptacle closing position.

9. In a device of the class described and in combination, an elongated wiping element comprising a fabric receptacle having an elongated opening at one side thereof, a water-soluble ice-melting material in said receptacle, a pair of separable elongated substantially parallel frame members substantially L-shaped in cross section and positioned back-to-back secured, respectively, to the free edges of said fabric adjacent said opening and cooperable with each other to close the open side of said receptacle, a clip comprising a pair of laterally spaced plates mounted, respectively, on said frame members, a latch pivotally mounted on one of said frame members, said latch having an elongated aperture therein adapted to receive said plates for securing the members in relatively fixed position with respect to each other and in receptacle closing position, a cross bar extending inwardly from one of said plates, and a finger piece on said latch for moving the latch from operative engagement with said plates.

10. In a device of the class described and in combination, an elongated wiping element comprising a fabric receptacle having an elongated opening at one side thereof, a water-soluble ice-melting material in said receptacle, a pair of separable elongated substantially parallel frame members secured, respectively, to the free edges of said receptacle adjacent said opening and cooperable with each other to close the open side of said receptacle, one of said frame members having a laterally extending flanged edge portion adapted to overlie and engage an adjacent edge portion of the other member, a clip comprising a pair of laterally spaced plates mounted, respectively, on said frame members, a latch movably mounted on one of said frame members and engageable with said plates for securing the members in relatively fixed position with respect to each other and in receptacle closing position, and a spacer cross bar on one of said plates extending inwardly toward and engaging the other of the plates.

11. In a device of the kind described and in combination, cooperating frame members, an elongated receptacle of water pervious flexible material having longitudinal free edges and a glass engaging face, said free edges being secured to the frame members with the said face opposite the same, means for securing the frame members together to provide a closed receptacle, ice melting material in the receptacle, the frame members adapted to separate to provide an opening for refilling the receptacle.

12. In a device of the class described and in combination, a water pervious bag like receptacle having a glass engaging portion at one side of the receptacle, frame means at the opposite side of the receptacle forming a rigid support for longitudinal edge portions of the receptacle which form a filler opening, said frame means comprising two separable parts engageable to close said opening, and cooperating locking means on said parts to maintain them in engaged position.

13. A device for applying an anti-freeze material to a surface subjected to precipitation of sleet, frost or the like which comprises a supply of anti-freeze material, a bag for holding the anti-freeze material, and having sides and a rubbing face of cloth, said face being substantially co-extensive with the area of the anti-freeze material which is pressed against said surface, and being of a substantially looser weave than the weave in the sides adjacent said face.

14. A device for dissolving sleet, frost and the like from a windshield, which comprises a stiff pressure distributing back, a solid stick of water soluble anti-freeze material with its back adapted to engage the pressure distributing back, a flexible bag adapted to hold said stick on said back and having a pervious water absorbent facing adapted to permit solution of the stick by diffusion therethrough, the face portion of said flexible bag which contacts the surface of said windshield being more permeable to water than the side portions of said bag adjacent to the face, and means for connecting said back to the wiper arm of a conventional wiper mechanism, said connecting means being adapted to transmit to the device pressure directed toward the surface being wiped and driving force in a transverse direction.

15. A device for dissolving sleet, frost and the like from a windshield, which comprises a stiff pressure distributing back, a solid stick of water soluble anti-freeze material with its back adapted to engage said pressure distributing back, a flexible bag adapted to hold said stick on said back and having a pervious water absorbent facing adapted to permit solution of the stick by diffusion therethrough, said bag being woven in a single width with the weave thereof more loosely arranged in the face portion thereof which contacts the windshield surface than in the adjacent portions which form the sides of the bag, and means for connecting said back to the wiper arm of a conventional wiper mechanism, said connecting means being adapted to transmit to the device pressure directed toward the surface being wiped and driving force in a transverse direction.

CARL BRAMMING.